(12) United States Patent
Ogawa et al.

(10) Patent No.: US 10,829,639 B2
(45) Date of Patent: Nov. 10, 2020

(54) CURABLE ORGANOPOLYSILOXANE COMPOSITION AND CURED PRODUCT THEREOF

(71) Applicant: Dow Corning Toray Co., Ltd., Tokyo (JP)

(72) Inventors: Takuya Ogawa, Chiba (JP); Satoshi Onodera, Chiba (JP)

(73) Assignee: Dow Toray Co., Ltd., Tokyo (JP)

( * ) Notice: Subject to any disclaimer, the term of this patent is extended or adjusted under 35 U.S.C. 154(b) by 32 days.

(21) Appl. No.: 15/773,589

(22) PCT Filed: Nov. 4, 2016

(86) PCT No.: PCT/JP2016/082889
§ 371 (c)(1),
(2) Date: May 4, 2018

(87) PCT Pub. No.: WO2017/082180
PCT Pub. Date: May 18, 2017

(65) Prior Publication Data
US 2018/0327594 A1 Nov. 15, 2018

(30) Foreign Application Priority Data
Nov. 13, 2015 (JP) .................. 2015-223521

(51) Int. Cl.
*C08K 5/23* (2006.01)
*C08L 83/04* (2006.01)
*C08G 77/28* (2006.01)
*C09D 183/04* (2006.01)
*C08K 5/14* (2006.01)
*C09D 183/06* (2006.01)
*C08K 5/08* (2006.01)
*C08K 5/37* (2006.01)

(52) U.S. Cl.
CPC .............. *C08L 83/04* (2013.01); *C08G 77/28* (2013.01); *C08K 5/14* (2013.01); *C08K 5/23* (2013.01); *C09D 183/04* (2013.01); *C09D 183/06* (2013.01); *C08K 5/08* (2013.01); *C08K 5/37* (2013.01)

(58) Field of Classification Search
None
See application file for complete search history.

(56) References Cited

U.S. PATENT DOCUMENTS

| 4,052,529 | A | * | 10/1977 | Bokerman | C08L 83/08 428/447 |
| 4,303,484 | A | * | 12/1981 | Takamizawa | C08L 83/08 427/515 |
| 4,780,486 | A | * | 10/1988 | Lee | C03C 25/106 522/14 |
| 5,063,102 | A | | 11/1991 | Lee et al. | |
| 5,158,988 | A | * | 10/1992 | Kurita | C08K 5/53 522/64 |
| 5,302,627 | A | * | 4/1994 | Field | C08F 2/46 522/13 |
| 5,973,021 | A | * | 10/1999 | Beck | C08L 83/08 522/180 |
| 8,865,787 | B2 | * | 10/2014 | Sakamoto | C08K 5/548 156/272.2 |
| 2007/0244288 | A1 | | 10/2007 | Tonge | |
| 2011/0048261 | A1 | * | 3/2011 | Shimura | B41C 1/05 101/395 |
| 2013/0287345 | A1 | * | 10/2013 | Van Den Berg | C08G 77/392 385/94 |
| 2014/0179870 | A1 | | 6/2014 | Kondo | |

FOREIGN PATENT DOCUMENTS

| CN | 101965542 A | 2/2011 |
| CN | 103874736 A | 6/2014 |
| EP | 0492830 B1 | 7/1996 |
| JP | H03227365 A | 10/1991 |
| JP | 2008184514 A | 8/2008 |
| JP | 2009086291 A | 4/2009 |
| JP | 2013043902 A | 3/2013 |
| JP | 2015096559 A | 5/2015 |
| JP | 2015193820 A | 11/2015 |
| JP | 2016060783 A | 4/2016 |

(Continued)

OTHER PUBLICATIONS

Data sheet from Akzo Nobel "Initiators for High Polymers", 17 pages, 2006. (Year: 2006).*
Azo Polymerization Initiators Comprehensive Catalog from Wako Pure Chemical Industries, Ltd. 36 pages, 2016. (Year: 2016).*
Sigma Aldrich data sheet for Free Radical Initiators, 2 pages, 1999 (Year: 1999).*
PCT/JP2016/082889 International Search Report dated Dec. 13, 2016, 4 pages.
English language abstract and machine translation for JP2008184514 (A) extracted from http://worldwide.espacenet.com database on May 17, 2018, 39 pages.
English language abstract and machine translation for JP2009086291 (A) extracted from http://worldwide.espacenet.com database on Jun. 7, 2018, 47 pages.

(Continued)

*Primary Examiner* — Robert S Loewe
(74) *Attorney, Agent, or Firm* — Warner Norcross + Judd LLP

(57) ABSTRACT

A curable organopolysiloxane composition comprises: (A) an alkenyl group-containing organopolysiloxane; (B) a compound having at least two thiol groups in a molecule; (C) an azo compound and/or an organic peroxide; and (D) at least one type of compound selected from the group consisting of quinone compounds, compounds having one or two aromatic hydroxyl groups in a molecule, compounds having one thiol group in a molecule, nitrosamine compounds, hydroxylamine compounds, and phenothiazine compounds. The curable organopolysiloxane composition can be quickly cured even at a relatively low temperature (e.g. of 80° C. or lower) to form a cured film with excellent adhesion to an object to be coated.

9 Claims, No Drawings

(56) References Cited

FOREIGN PATENT DOCUMENTS

| WO | 2015069454 A1 | 5/2015 |
| WO | 2017068762 A1 | 4/2017 |

OTHER PUBLICATIONS

English language abstract and machine translation for JP2013043902 (A) extracted from http://worldwide.espacenet.com database on Jun. 7, 2018, 43 pages.
English language abstract and machine translation for JP2015096559 (A) extracted from http://worldwide.espacenet.com database on Jun. 7, 2018, 20 pages.
English language abstract and machine translation for JP2015193820 (A) extracted from http://worldwide.espacenet.com database on May 17, 2018, 35 pages.
Machine assisted English translation of CN101965542A obtained from https://patents.google.com/patent dated Jul. 17, 2020, 25 pages.
Machine assisted English translation of JP2016060783A obtained from https://worldwide.espacenet.com/ dated Aug. 20, 2020, 14 pages.

\* cited by examiner

CURABLE ORGANOPOLYSILOXANE COMPOSITION AND CURED PRODUCT THEREOF

CROSS-REFERENCE TO RELATED APPLICATIONS

This application is the National Stage of International Application No. PCT/JP2016/082889 filed on 04 Nov. 2016, which claims priority to and all advantages of Japanese Patent Appl. No. 2015-22352 filed on 13 Nov. 2015, the content of which is hereby incorporated by reference.

TECHNICAL FIELD

The present invention relates to a curable organopolysiloxane composition and a cured product thereof.

BACKGROUND ART

Curable organopolysiloxane compositions are used for adhesives, sealants, coating agents, and the like of electric/electronic parts because they can be cured to form cured products with excellent adhesion, bonding property, weather resistnce, and electrical characteristics. Well-known curing reactions for such compositions include dehydration condensation reaction, dealcoholization condensation reaction, and other condensation reaction type curing; hydrosilylation reaction of ethylenic unsaturated groups and silicon atom-bonded hydrogen atoms, ene-thiol reaction of ethyleneic unsaturated groups and mercapto groups, and other addition reactions. Addition reaction type compositions are usually used in the coating applications since it is difficult for gapes or cracks to occur during curing and warping after curing can be suppressed.

For example, Patent Document 1 discloses a sealant for a liquid crystalline comprising: a radical curable resin having two or more ethylenic unsaturated bonds in a molecule; a thiol compound having two or more primary or secondary mercapto groups in a molecule and having a tertiary or quarternary carbon as the carbon at β-position with respect to said primary mercapto group; and a radical polymerization initiator. While, Patent Document 2 discloses a curable resin composition comprising: a mercapto group-containing polysiloxane; and a vinyl-based compound.

These compositions, however, substantially require heating at a temperature of 110° C. or higher during the curing process. It is necessary to increase the activity of the polymerization initiator at a low temperature of about 80° C. in order to complete the curing reaction quickly at that temperature. As a result, however, it becomes difficult to maintain a good storage stability at ordinary temperature.

Therefore, it is required to develop an addition reaction type curable organopolysiloxane composition with good storage stability at ordinary temperature so that it can have sufficient workability, while it can be quickly cured at a low temperature of about 80° C.

CITATION LIST

Patent Literature

Patent Document 1: Japanese Unexamined Patent Application Publication No. 2009-86291
Patent Document 2: Japanese Unexamined Patent Application Publication No. 2013-43902

SUMMARY OF INVENTION

Technical Problem

An objective of the present invention is to provide a curable organopolysiloxane composition, which can be quickly cured even at a relatively low temperature of 80° C. or lower to form a cured film with excellent adhesion to an object to be coated, and a cured product with excellent adhesion to the object.

Solution to Problem

The curable organopolysiloxane composition of the present invention is characterized by comprising:

(A) an alkenyl group-containing organopolysiloxane represented by the following average compositional formula:

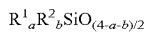

wherein, $R^1$ represents a $C_{2-12}$ alkenyl group; $R^2$ represents a hydrogen atom, $C_{1-12}$ alkyl group, $C_{6-20}$ aryl group, $C_{7-20}$ aralkyl group, hydroxyl group, or a $C_{1-6}$ alkoxy group; however, there are at least two $R^1$ in a molecule; "a" and "b" are numbers satisfying: $0 < a \leq 1$, $0 < b < 3$, and $0.8 < a+b < 3$;

(B) a compound having at least two thiol groups in a molecule, in an amount such that the thiol groups in component (B) is 0.3 to 3 mol with respect to 1 mol of the alkenyl groups in component (A);

(C) an azo compound and/or an organic peroxide; and (D) at least one type of compound selected from a group consisting of quinone compounds, compounds having one or two aromatic hydroxyl groups in a molecule, compounds having one thiol group in a molecule, nitrosamine compounds, hydroxylamine compounds, and phenothiazine compounds.

The cured product of the present invention is characterized by being obtained by curing the aforementioned curable organopolysiloxane composition.

Effects of Invention

The curable organopolysiloxane composition of the present invention has good curability at relatively low temperature and can form cured film with excellent adhesion to an object to be coated. The cured product of the present invention is characterized by having excellent adhesion to the object.

DETAILED DESCRIPTION OF THE INVENTION

First, the curable organopolysiloxane composition of the present invention will be described in details.

The alkenyl group-containing organopolysiloxane for component (A) is a main component of this composition and is represented by the following average compositional formula:

In the formula, $R^1$ represents a $C_{2-12}$ alkenyl group, such as vinyl group, allyl group, butenyl group, pentenyl group, hexenyl group, heptenyl group, octenyl group, nonenyl group, decenyl group, undecenyl group, and dodecenyl group. In consideration of economy and reactivity, it is preferably vinyl group, allyl group, hexenyl group, or octenyl group. Component (A) has at least two alkenyl groups in a molecule.

In the formula, $R^2$ represents a hydrogen atom, $C_{1-12}$ alkyl group, $C_{6-20}$ aryl group, $C_{7-20}$ aralkyl group, hydroxyl group, or a $C_{1-6}$ alkoxy group. Examples of the alkyl group include methyl group, ethyl group, propyl group, butyl group, pentyl group, hexyl group, heptyl group, octyl group, nonyl group, decyl group, undecyl group, and dodecyl group. Methyl group is preferred in consideration of economy and heat resistance. Examples of the aryl group include phenyl group, tolyl group, xylyl group, naphthyl group, biphenyl group, and phenoxyphenyl group. Phenyl group, tolyl group, or naphthyl group are preferred in consideration of economy. In particular, when the aryl group, especially, phenyl group is introduced into component (A), the compatibility with component (B) will be improved, and the weather resistance of the obtained cured product will be improved. Examples of the aralkyl group include benzyl group, phenetyl group, and methyl phenyl methyl group. Examples also include groups in which some or all of the hydrogen atoms bonded to the alkyl groups, aryl groups, or the aralkyl groups are substituted by chlorine atoms, brome atoms, or other halogen atoms. Examples of the alkoxy group include methoxy group, ethoxy group, n-propoxy group, i-propoxy group, n-butoxy group, sec-butoxy group, and tert-butoxy group. $R^2$ may be two or more types of the aforementioned groups.

In the formula, "a" represents the proportion of the $C_{2-12}$ alkenyl groups with respect to the silicon atoms. It is a number satisfying: $0<a<1$, preferably, $0<a\leq0.6$ or $0<a\leq0.4$. In the formula, "b" represents the proportion of the hydrogen atoms, $C_{1-12}$ alkyl groups, $C_{6-20}$ aryl groups, $C_{7-20}$ aralkyl groups, hydroxyl groups, or the $C_{1-6}$ alkoxy groups with respect to the silicon atoms. It is a number satisfying: $0<b<3$. However, the sum of "a" and "b" is a number satisfying: $0.8<a+b<3$, preferably, $1<a+b\leq2.2$ or $1<a+b\leq2.0$. If "a" is a number in the aforementioned range, the curability of the obtained curable organopolysiloxane composition at relatively low temperature is good, and the mechanical strength of the obtained cured product is good. While, when "b" is a number in the aforementioned range, the mechanical strength of the obtained cured product is improved. On the other hand, if the sum of "a" and "b" is a number in the aforementioned range, the curability of the obtained curable organopolysiloxane composition at relatively low temperature is good, and the mechanical strength of the obtained cured product is good.

There is no limitation on the molecular weight of component (A). However, its weight average molecular weight measured using the gel permeation chromatography method is preferred to be in the range of 1,000 to 50,000. If the weight average molecular weight of component (A) is equal to or higher than the lower limit of the aforementioned range, the mechanical property of the obtained cured product is good. On the other hand, if the molecular weight is equal to or lower than the upper limit of the aforementioned range, the curing rate of the obtained curable organopolysiloxane composition can be improved.

The organopolysiloxanes represented by the following average unit formulas are listed as examples for component (A). These organopolysiloxanes can be used either alone or as a mixture of two or more kinds. In the formulas, Me, Ph, and Vi represent methyl group, phenyl group, and vinyl group, respectively. x1, x2, x3, and x4 are positive numbers, and the sum of x1, x2, x3, and x4 in a molecule is 1.

$(Me_2ViSiO_2)_{x1}(Me_2SiO_{2/2})_{x2}$
$(Me_3SiO_{1/2})_{x1}(Me_2SiO_{2/2})_{x2}(MeViSiO_{2/2})_{x3}$
$(Me_2ViSiO_{1/2})_{x1}(Me_2SiO_{2/2})_{x2}(MeViSiO_{2/2})_{x3}$
$(Me_3SiO_{1/2})_{x1}(MeViSiO_{2/2})_{x2}(MeSiO_{3/2})_{x3}$
$(Me_2ViSiO_{1/2})_{x1}(Me_2SiO_{2/2})_{x2}(MeSiO_{3/2})_{x3}$
$(Me_2ViSiO_{1/2})_{x1}(Me_2SiO_{2/2})_{x2}(MeViSiO_{2/2})_{x3}$ $(MeSiO_{3/2})_{x4}$
$(Me_2ViSiO_{1/2})_{x1}(Me_2SiO_{2/2})_{x2}(SiO_{4/2})_{x3}$
$(Me_2ViSiO_{1/2})_{x1}(Me_2SiO_{2/2})_{x2}(MePhSiO_{2/2})_{x3}$
$(Me_3SiO_{1/2})_{x1}(MeViSiO_{2/2})_{x2}(MePhSiO_{2/2})_{x3}$
$(Me_3SiO_{1/2})_{x1}(Me_2SiO_{2/2})_{x2}(MeViSiO_{2/2})_3$ $(MePhSiO_{2/2})_{x4}$
$(Me_2ViSiO_{1/2})_{x1}(MePhSiO_{2/2})_{x2}$
$(Me_2PhSiO_{1/2})_{x1}(Me_2SiO_{2/2})_{x2}(MeViSiO_{2/2})_{x3}$
$(MePh_2SiO_{1/2})_{x1}(Me_2SiO_{2/2})_{x2}(MeViSiO_{2/2})_{x3}$
$(Me_2ViSiO_{1/2})_{x1}(Me_2SiO_{2/2})_{x2}(Ph_2SiO_{2/2})_{x3}$
$(Me_2ViSiO_{1/2})_{x1}(Me_2SiO_{2/2})_{x2}(PhSiO_{3/2})_{x3}$
$(Me_3SiO_{1/2})_{x1}(MeViSiO_{2/2})_{x2}(PhSiO_{3/2})_{x3}$
$(Me_3SiO_{1/2})_{x1}(Me_2SiO_{2/2})_{x2}(MeViSiO_{2/2})_{x3}(PhSiO_{3/2})_{x4}$
$(Me_2ViSiO_{1/2})_{x1}(Me_2SiO_{2/2})_{x2}(MePhSiO_{2/2})_{x3}$ $(PhSiO_{3/2})_{x4}$
$(Me_2ViSiO_{1/2})_{x1}(Me_2SiO_{2/2})_{x2}(MeSiO_{3/2})_{x3}(PhSiO_{3/2})_{x4}$

The compound for component (B) is a component that reacts with the alkenyl groups in component (A) to cure this composition. There is no limitation on component (B) as long as it has at least two thiol groups in a molecule. Preferably, it is (B1) a thiol group-containing organopolysiloxane represented by the following average compositional formula:

$$R^3_c R^4_d SiO_{(4-c-d)/2}$$

and/or (B2) a thiol compound having at least two thiol groups in a molecule.

For component (B1), in the formula, $R^3$ is at least one type of thiol group selected from a group consisting of thiolalkyl groups and thiolaryl groups. Examples of the thiolalkyl group include 3-thiolpropyl group, 4-thiolbutyl group, and 6-thiolhexyl group. Examples of the thiolaryl group include 4-thiolphenyl group, 4-thiolmethylphenyl group, and 4-(2-thiolethyl)phenyl group. Component (B1) has at least two thiol groups in a molecule.

In the formula, $R^4$ represents a hydrogen atom, $C_{1-12}$ alkyl group, $C_{6-20}$ aryl group, $C_{7-20}$ aralkyl group, hydroxyl group, or a $C_{1-6}$ alkoxy group. Examples of the alkyl group are the same as those of said $R^2$. Methyl group is preferred in consideration of economy and heat resistance. Examples of the aryl group are the same as those of said $R^2$. Phenyl group, tolyl group, or naphthyl group are preferred in consideration of economy. Examples of the aralkyl group are the same as those of said $R^2$. Examples also include the groups in which some or all of the hydrogen atoms bonded to the alkyl groups, aryl groups, or the aralkyl groups are substituted by chlorine atoms, brome atoms, or other halogen atoms. Examples of the alkoxy group are the same as those of said $R^2$. $R^4$ may be two or more types of the aforementioned groups.

In the formula, "c" represents the proportion of the thiol groups with respect to the silicon atoms. It is a number satisfying: $0<c<1$, preferably, $0<c\leq0.6$ or $0<c\leq0.4$. Also, in the formula, "d" represents the proportion of the hydrogen atoms, $C_{1-12}$ alkyl groups, $C_{6-20}$ aryl groups, $C_{7-20}$ aralkyl groups, hydroxyl groups, or the $C_{1-6}$ alkoxy groups with respect to the silicon atoms. It is a number satisfying: $0<d<3$. However, the sum of "c" and "d" is a number satisfying: $0.8<c+d<3$, preferably, $1<c+d\leq2.5$ or $1<c+d\leq2.3$. If "c" is a number in the aforementioned range, the curability of the obtained curable organopolysiloxane composition at relatively low temperature is good, and the mechanical strength of the obtained cured product is good. While, when "d" is a number in the aforementioned range, the mechanical strength of the obtained cured product is improved. On the other hand, if the sum of "c" and "d" is a number in the aforementioned range, the curability of the obtained curable organopolysiloxane composition at relatively low temperature is good, and the mechanical strength of the obtained cured product is good.

There is no limitation on the molecular weight of component (B1). However, its weight average molecular weight measured using the gel permeation chromatography method is preferred to be in the range of 500 to 50,000. If the weight average molecular weight of component (B1) is equal to or higher than the lower limit of the aforementioned range, the mechanical property of the obtained cured product is good. On the other hand, if the molecular weight is equal to or lower than the upper limit of the aforementioned range, the curing rate of the obtained curable organopolysiloxane composition can be improved.

The organopolysiloxanes represented by the following average unit formulas are listed as examples of component (B1). These organopolysiloxanes can be used either alone or as a mixture of two or more kinds. In the formulas, Me, Ph, and Thi represent methyl group, phenyl group, and 3-thiolpropyl group, respectively. y1, y2, y3, and y4 are positive numbers, and the sum of y1, y2, y3, and y4 in a molecule is 1.

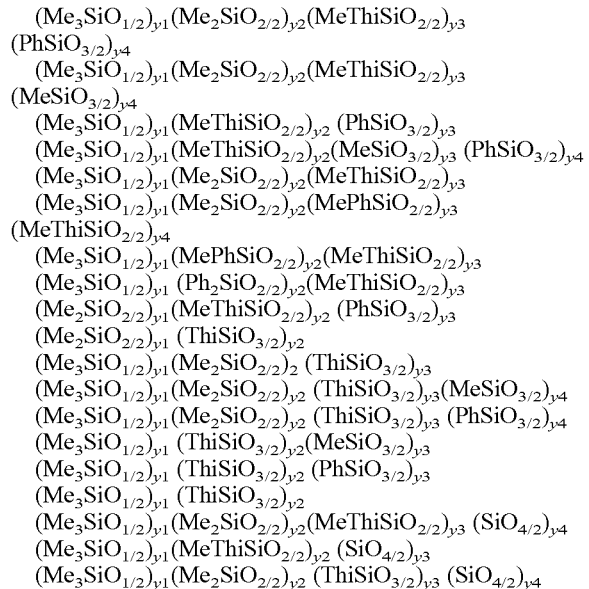

$(Me_3SiO_{1/2})_{y1}(Me_2SiO_{2/2})_{y2}(MeThiSiO_{2/2})_{y3}(PhSiO_{3/2})_{y4}$
$(Me_3SiO_{1/2})_{y1}(Me_2SiO_{2/2})_{y2}(MeThiSiO_{2/2})_{y3}(MeSiO_{3/2})_{y4}$
$(Me_3SiO_{1/2})_{y1}(MeThiSiO_{2/2})_{y2}(PhSiO_{3/2})_{y3}$
$(Me_3SiO_{1/2})_{y1}(MeThiSiO_{2/2})_{y2}(MeSiO_{3/2})_{y3}(PhSiO_{3/2})_{y4}$
$(Me_3SiO_{1/2})_{y1}(Me_2SiO_{2/2})_{y2}(MeThiSiO_{2/2})_{y3}$
$(Me_3SiO_{1/2})_{y1}(Me_2SiO_{2/2})_{y2}(MePhSiO_{2/2})_{y3}(MeThiSiO_{2/2})_{y4}$
$(Me_3SiO_{1/2})_{y1}(MePhSiO_{2/2})_{y2}(MeThiSiO_{2/2})_{y3}$
$(Me_3SiO_{1/2})_{y1}(Ph_2SiO_{2/2})_{y2}(MeThiSiO_{2/2})_{y3}$
$(Me_2SiO_{2/2})_{y1}(MeThiSiO_{2/2})_{y2}(PhSiO_{3/2})_{y3}$
$(Me_2SiO_{2/2})_{y1}(ThiSiO_{3/2})_{y2}$
$(Me_3SiO_{1/2})_{y1}(Me_2SiO_{2/2})_{y2}(ThiSiO_{3/2})_{y3}$
$(Me_3SiO_{1/2})_{y1}(Me_2SiO_{2/2})_{y2}(ThiSiO_{3/2})_{y3}(MeSiO_{3/2})_{y4}$
$(Me_3SiO_{1/2})_{y1}(Me_2SiO_{2/2})_{y2}(ThiSiO_{3/2})_{y3}(PhSiO_{3/2})_{y4}$
$(Me_3SiO_{1/2})_{y1}(ThiSiO_{3/2})_{y2}(MeSiO_{3/2})_{y3}$
$(Me_3SiO_{1/2})_{y1}(ThiSiO_{3/2})_{y2}(PhSiO_{3/2})_{y3}$
$(Me_3SiO_{1/2})_{y1}(ThiSiO_{3/2})_{y2}$
$(Me_3SiO_{1/2})_{y1}(Me_2SiO_{2/2})_{y2}(MeThiSiO_{2/2})_{y3}(SiO_{4/2})_{y4}$
$(Me_3SiO_{1/2})_{y1}(MeThiSiO_{2/2})_{y2}(SiO_{4/2})_{y3}$
$(Me_3SiO_{1/2})_{y1}(Me_2SiO_{2/2})_{y2}(ThiSiO_{3/2})_{y3}(SiO_{4/2})_{y4}$

There is no limitation on the thiol compound for (B2) as long as it has at least two thiol groups in a molecule. Specific examples include trimethylolpropane-tris(3-thiolpropionate), trimethylolpropane-tris(3-thiolbutylate), trimethylolethane-tris(3-thiolbutylate), pentaerythritol-tetrakis(3-thiolpropionate), tetraethylene glycol-bis(3-thiolpropionate), dipentaerythritol-hexakis(3-thiolpropionate), pentaerythritol-tetrakis(3-thiolbutylate), 1,4-bis(3-thiolbutylyloxy)butane, and other ester compounds of thiol carboxylic acids and polyhydric alcohols; ethanedithiol, propanedithiol, hexanemethylenedithiol, decamethylenedithiol, bis(2-thiolethyl)ether, 3,6-dioxa-1,8-octanedithiol, 1,4-benzenedithiol, toluene-3,4-dithol, xylylenedithol, and other aliphatic or aromatic thiol compounds; and 1,3,5-tris[(3-thiolpropionyloxy)-ethyl]-isocyanurate, 1,3,5-tris[(3-thiolbutylyloxy)-ethyl]-isocyanurate, and mixtures of two or more kinds of the aforementioned compounds.

There is limitation on the molecular weight of the thiol compound, which is preferred to be in the range of 200 to 2,000, 300 to 1,500, or 400 to 1,500. If the molecular weight is equal to or higher than the the lower limit of the aforementioned range, the volatility of the thiol compound becomes low so that the problem of offensive odor can be alleviated. On the other hand, if the molecular weight is equal to or lower than the upper limit of the aforementioned range, the solubility with respect to component (A) can be improved.

The content of component (B) in this composition is such that the amount of the thiol groups in this component is in the range of 0.3 to 3 mol, preferably, in the range of 0.5 to 2 mol, or 0.8 to 1.5 mol with respect to 1 mol of the alkenyl groups in component (A). If the content of component (B) is equal to or higher than the lower limit of the aforementioned range, the obtained curable organopolysiloxane composition can be well cured. On the other hand, if the content is equal to or lower than the upper limit of the aforementioned range, the mechanical strength of the obtained cured product can be improved.

Component (C) is a component used for accelerating curing of this composition. It is an azo compound and/or an organic peroxide. Examples of the azo compound include 1,1'-azobis(cyclohexane-1-carbonitrile), 2,2'-azobis(2-methylbutylonitrile), 2,2'-azobis(isobutylonitrile) (AIBN), 2,2'-azobis(2,4-dimethylvaleronitrile), 2,2'-azobis(4-methoxy-2,4-dimethylvaleronitrile), and other azonitrile compounds; dimethyl-2,2'-azobis(isobutylate), and other azoester compounds; 2,2'-azobis(N-butyl-2-methylpropionamide), 2,2'-azobis[N-(2-propenyl)-2-methylpropionamide], 2,2'-azobis[N-(2-(hydroxyethyl)-2-methylpropionamide), and other azoamide compounds.

Examples of the organic peroxide include dibenzoyl peroxide, bis(3-carboxypropionyl)peroxide, dilauroyl peroxide, di(3,5,5-trimethylhexanoyl) peroxide, diisobutylyl peroxide, and other diacyl peroxide compounds; di(n-propylperoxy)dicarbonate, di(isopropylperoxy)dicarboante, di(2-ethylhexylperoxy)dicarboante, and other peroxydicarbonate compounds; tert-butylperoxy-2-ethylhexanoate, tert-hexylperoxy-2-ethylhexanoate, 1,1,3,3-tetramethylbutylperoxy-oxy-2-ethylhexanoate, tert-butylperoxypivalate, tert-butylperoxyneodecanate, 1,1,3,3-tetramethylbutylperoxyneodecanate, cumylperoxyneodecanate, and other peroxyester compounds; 1,1'-di(tert-butylperoxy)-2-methylcyclohexane, 1,1'-di(tert-butylperoxy)-3,3,5-trimethylcyclohexane, and other peroxyketal compounds.

It is preferred to use an azo compound as component (C). These azo compounds can be used either alone or as a mixture of two or more kinds. Also, it is preferred to use a compound with a 10 hrs. half-life temperature of 25° C. or higher but lower than 70° C. as component (C). The curing rate and bathlife of the curable organopolysiloxane composition disclosed in the present invention can be adjusted by appropriately selecting component (C).

The content of component (C) preferred to be in the range of 0.01 to 10 mass %, more preferably, in the range of 0.01 to 1 mass % or 0.05 to 0.5 mass % with respect to the total amount of components (A) to (C). If the content of component (C) is equal to or higher than the lower limit of the aforementioned range, the curing reaction of the obtained composition can be accelerated. On the other hand, if the content equal to equal to or lower than the upper limit of the aforementioned range, the obtained cured product is difficult to color even by heat aging. The curing rate and bathlife of this composition can be adjusted by appropriately adjusting the content of component (C) in this composition.

Component (D) is a component used for improving the storage stability of this composition. It is one or more types of compounds selected from a group consisting of quinone compounds, compounds having one or two aromatic hydroxyl groups in one molecule, compounds having one thiol group in a molecule, nitrosamine compounds, hydroxylamine compounds, and phenothiazine compounds.

Examples of the quinone compound include 1,4-benzoquinone (p-quinone), methyl-p-benzoquinone, 2,5-dimethyl-1,4-benzoquinone, 1,4-naphthoquinone, 2,3-dichloro-1,4-naphthoquinone, anthraquinone, 2-methylanthraquinone, 2-ethylanthraquinone, 2-aminoanthraquinone, 1-aminoanthraquinone, 1-amino-2-methylanthraquinone, 2-amino-3-hydroxyanthraquinone, 1,4-dihydroxyanthraquinone, 1,5-dihydroxyanthraquinone, 1,8-dihyroxyanthraquinone, 1-chloroanthraquinone, 1,4-diaminoanthraquinone, 1,5-dichloroanthraquinone, 1,8-dichloroanthraquinone, and 1-nitroanthraquinone.

Examples of the compound having one or two aromatic hydroxyl groups in a molecule include hydroquinone, tert-butylhydroquinone, methylhydroquinone, phenyl-hydroquinone, chlorohydroquinone, 2,5-di-tert-butylhydroquinone, 2,5-di-tert-amylhydroquinone, trimethylhydroquinone, methoxyhydroquinone, and other hydroquinone compounds; 4-tert-butylcatechol and other catechol compounds; 4-ethoxyphenol, 4-methoxyphenol, 4-propoxyphenol, 2,6-bis(hydroxymethyl)-p-cresol, 2,6-di-tert-butyl-4-methylphenol, 2,6-di-tert-butyl-4-hydroxymethylphenol, 2-(4-hydroxyphenyl)ethanol, 4-nitrosophenol, and other substituted phenol compounds.

Examples of the compound having one thiol group in a molecule include benzenethiol, 2-ethylbenzenethiol, 4-ethylbenzenethiol, 4-isopropylbenzenethiol, 4-tert-butylbenzenethiol, 3-methoxybenzenethiol, 5-tert-butyl-2-methylbenzenethiol, 3-chlorobenzenethiol, 4-chlorobenzenethiol, 2,4-dichlorobenzenethiol, and other aromatic thiol compounds; benzyl mercaptan, 4-chlorobenzyl mercaptan, 1-butanethiol, 2-butanethiol, 2-methyl-1-propanethiol, 2-methyl-2-propanethiol, cyclo-hexanethiol, 1-hexanethiol, 2-ethyl-1-hexanethiol, 1-decanethiol, 1-dodecanethiol, and other aliphatic thiol compounds; 2-benzimidazolethiol, 2-benzoxazolthiol, 2-pyridinethiol, 4,6-dimethyl-2-thiolpyrimidine, 2-thiazoline-2-thiol, and other heterocyclic thiol compounds.

Examples of the nitrosoamine compound include N-ethyl-N-(4-hydroxybutyl)nitrosamine, N-butyl-N-(4-hydroxybutyl)nitrosamine, ammonium nitrosophenyl hydroxylamine (Cupferron), N,N'-dinitrosopentamethylene tetramine, N-nitrosodibutylamine, N-nitrosodiphenylamine, N-nitroso-N-methylaniline, N-methyl-N-nitrosurethane, and other nonmetallic compounds; N-nitrosophenylhyroxylamine aluminum salts, and other metal salt compounds.

Examples of the hydroxylamine compound include N-benzoyl-N-phenylhydroxylamine, N,N-diethylhydroxylamine, N,N-dibenzylhydroxylamine, and N,N-dioctadecylhydroxylamine.

Examples of the phenothiazine compound include phenothiazine, 2-chlorophenothiazine, 2-methoxyphenothiazine, 2-methylthiophenothiazine, and 2-ethylthiophenothiazine.

The content of component (D) is preferred to be in the range of 0.001 to 10 mass %, more preferably, in the range of 0.005 to 5 mass % or 0.005 to 1 mass % with respect to the total amount of components (A) to (D). If the content of component (D) is equal to or higher than the lower limit of the aforementioned range, the storage stability of the obtained composition can be improved. If the content is equal to or lower than the upper limit of the aforementioned range, the curing rate is sufficiently high during thermosetting, and the obtained cured compound is difficult to color even due to heat aging. The curing rate and bathlife of this composition can be adjusted by appropriately adjusting the content of component (D).

The composition of the present invention can be used without using solvent. However, if it is desired to lower the viscosity of this composition or form a cured product on a thin film, (E) an organic solvent can be added as demanded. There is no special limitation on the organic solvent as long as it does not hinder curing of this composition and can homogenously dissolve the entire composition. It is preferred to use an organic solvent with a boiling point of 70° C. or higher but lower than 200° C. Specific examples include i-propyl alcohol, t-butyl alcohol, cyclohexanol, ethyl acetate, propyl acetate, butyl acetate, cyclohexanone, methyl ethyl ketone, methyl isobutyl ketone, toluene, xylene, mesitylene, 1,4-dioxane, dibutyl ether, anisole, 4-methyl anisole, ethyl benzene, ethoxybenzene, ethylene glycol, ethylene glycol dimethyl ether, ethylene glycol diethyl ether, 2-methoxyethanol (ethylene glycol monomethyl ether), diethylene glycol dimethyl ether, diethylene glycol monomethyl ether, 1-methoxy-2-propyl acetate, 1-ethoxy-2-propylacetate, octamethyl cyclotetrasiloxane, hexamethyl disiloxane, and other non-halogen solvents: 1,1,2-trichloroethane, chlorobenzene, and other halogen-based solvents; mixtures of two or more types of the aforementioned solvents.

There is no limitation on the content of component (E) in this composition. Preferably, it is 3,000 parts by mass or less, or 1,000 parts by mass or less with respect to 100 parts by weight of the total amounts of components (A) to (C).

There is no limitation on the viscosity of this composition at 25° C., which is preferred to be in the range of 10 to 100,000 mPa·s or in the range of 10 to 10,000 mPa·s. It is also possible to add an organic solvent into this composition to adjust the viscosity to the aforementioned range.

If necessary, other components can also be added into the composition of the present invention as long as they do not affect the objective of the present invention. Examples of these components include fumed silica, crystalline silica, fused silica, wet silica, titanium oxide, zinc oxide, iron oxide, and other metal oxide fine powders; vinyltri-ethoxysialne, allyltrimethoxysilane, allyltriethoxysilane, 3-glycidoxypropyltrimethoxysilane, 3-methacryloxypropyltrimethoxysilane, and other adhesion promoters; nitrides, sulfides, and other inorganic fillers, pigments, heat resistance improving agents, and other well-known additives.

The composition of the present invention can be prepared by homogeneously blending components (A) to (D) and any other components as demanded. Various types of stirrers or kneaders can be used to mix the components at ordinary temperature when preparing the composition of the present invention. If it is a composition that is not easy to cure during blending, it is also possible to perform blending under heating. There is no limitation on the order of adding the components, which can be blended in any order.

The curing reaction of this composition can be carried out even at a relatively low temperature of 70 to 80° C. The time taken by the curing reaction varies depending on the types of components (A) to (D) and the shape of the molding product but is usually within 1 hr. The time needed to cure a thin film-like composition with a thickness of 0.1 mm or less is usually within 5 min.

This composition can be applied to coating on a base material lacking heat resistance since it can be cured even at a relatively low temperature. Examples of the coating method used for this composition include gravure coating, offset coating, offset gravure, roll coating, reverse roll coating, air knife coating, curtain coating, and comma coating.

Examples of the base material include paperboard, corrugated paper, clay-coated paper, polyolefin laminated paper, particularly, polyethylene laminated paper, synthetic resin film/sheet/coating film, natural fiber fabric, synthetic fiber fabric, artificial leather cloth, metal foil, metal sheet, and concrete. Synthetic resin film/sheet/coating film is particularly preferred. In the case of a multi-layer coating film, this composition is usually coated on a coating film made of epoxy resin, acrylic resin, urethane-based resin, or the like.

In the following, the cured product of the present invention will be described in details.

The cured product of the present invention is characterized by being obtained by curing the aforementioned curable organopolysiloxane composition. There is no special limitation on the shape of the cured product, which may be sheet, film, tape, or the like.

For example, after the composition of the present invention is coated on a film-like base material, a tape-like base material, or a sheet-like base material, it is cured at 70 to 80° C. A cured film comprising this cured product can be formed on the surface of the aforementioned base material. There is no limitation on the thickness of the cured film, which is preferred to be in the range of 0.1 to 500 m, more preferably, in the range of 0.1 to 50 m.

EXAMPLES

The curable organopolysiloxane composition and its cured product disclosed in the present invention will be described in details based on Examples. In formulas, Me, Ph, Vi, and Thi represent methyl group, phenyl group, vinyl group, and 3-thiolpropyl group, respectively. The viscosity, weight average molecular weight, and thiol equivalent in the Examples were measured as follows.

<Viscosity>

The viscosity at 25° C. was measured using a rotary viscometer VG-DA produced by Shibaura System Co., Ltd.

<Weight Average Molecular Weight>

The weight average molecular weight relative to standard polystyrene was derived by a gel permeation chromatography using an RI detector.

<Vinyl Equivalent, Thiol Equivalent>

The vinyl equivalent (g/mol) or thiol equivalent (g/mol) of the organopolysiloxane was derived from a structure identified by nuclear magnetic resonance spectral analysis.

Synthesis Example 1: Preparation of a Vinyl Group-Containing Organopolysiloxane 99 g of phenyltrimethoxysilane, 1200 g of dimethyldimethoxysilane, 466 g of 1,3-divinyl-1,1,3,3-tetramethyldisiloxane, and 0.9 g of trifluoromethanesulfonic acid were added and stirred in a reactor equipped with stirrer, thermometer, refluxcondenser, and dropping funnel. 315 g of ion exchange water was added dropwise at room temperature, followed by 1 h of stirring performed under methanol reflux. After cooling, toluene was added, and 7.5 g of a 11N-potassium hydroxide aqueous solution was added. The generated methanol and the unreacted water were removed by azeotropic dehydration. After the system was neutralized by using 7.3 g of acetic acid, the remaining low-boiling fractions were removed by distillation performed under a reduced pressure. Then, the solid by-product was filtered out, thereby obtaining a colorless transparent liquid with a viscosity of 52 mPa·s.

This liquid had weight average molecular weight=1,200 and vinyl equivalent=371 g/mol. The $^{13}$C-nuclear magnetic resonance spectral analysis confirmed that this liquid was a vinyl group-containing organopolysiloxane represented by the following average unit formula:

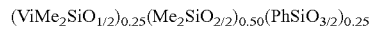

$(ViMe_2SiO_{1/2})_{0.25}(Me_2SiO_{2/2})_{0.50}(PhSiO_{3/2})_{0.25}$ and the following average compositional formula:

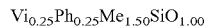

$Vi_{0.25}Ph_{0.25}Me_{1.50}SiO_{1.00}$

The content of hydroxyl groups or methoxy groups was less than 1 wt %.

Synthesis Example 2: Preparation of a thiol group-containing organopolysiloxane 1,374 g of 3-thiolpropyltrimethoxysilane, 1,680 g of dimethyldimethoxysilane, and 1.18 g of trifluoromethanesulfonic acid were added and stirred in a reactor equipped with stirrer, thermometer, refluxcondenser, and dropping funnel. 882 g of ion exchange water was added dropwise at room temperature, followed by 1 hr. of stirring performed under methanol reflux. After cooling, calcium carbonate and cyclohexane were added. The generated methanol and the unreacted water were removed by azeotropic dehydration. The remaining low-boiling fractions were removed by distillation performed under a reduced pressure. Then, the solid by-product was filtered out, thereby obtaining a colorless transparent liquid with a viscosity of 560 mPa·s.

This liquid had weight average molecular weight=4,000 and thiol equivalent=260 g/mol. The $^{13}$C-nuclear magnetic resonance spectral analysis confirmed that this liquid was a thiol group-containing organopolysiloxane represented by the following average unit formula:

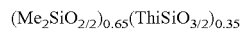

$(Me_2SiO_{2/2})_{0.65}(ThiSiO_{3/2})_{0.35}$ and the following average compositional formula:

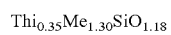

$Thi_{0.35}Me_{1.30}SiO_{1.18}$

Practical Examples 1 to 15, Comparative Examples 1 to 5

The following components were used to prepare solventless curable organopolysiloxane compositions (parts by mass) shown in Tables 1 to 3. For these curable organopolysiloxane compositions, the amount of the thiol groups in component (B) was adjusted to 1 mol with respect to 1 mol of the vinyl groups in component (A).

The following component was used as component (A).

(a-1): The vinyl group-containing organopolysiloxane prepared in Synthesis Example 1

The following component was used as component (B).

(b-1): The thiol group-containing organopolysiloxane prepared in Synthesis Example 2

The following components were used as component (C).

(c-1): 2,2'-azobis(4-methoxy-2,4-dimethylvaleronitrile)

(c-2): 2,2'-azobis(2,4-dimethylvaleronitrile)

(c-3): 2,2'-azobis(2-methylbutylonitrile)

(c-4): Dibenzoylperoxide (c-5): 2,2'-dimethoxy-2-phenylacetophenone (c-6): 2-hydroxy-2-methylpropiophenone The following components were used as component (D).

(d-1): Naphthoquinone (d-2): Benzoquinone (d-3): 2,6-di-tert-butyl-4-methylphenol (d-4): 4-methoxyphenol (d-5): 1-dodecanethiol (d-6): N-nitrosophenylhydroxylamine aluminum salt
(d-7): N,N-diethylhydroxylamine
(d-8): Phenothiazine The curable organopolysiloxane compositions were evaluated as follows.

<Appearance>

After each curable organopolysiloxane composition was prepared, its appearance was visually observed.

<Curability>

The curable organopolysiloxane composition was spread on an aluminum dish in such an amount that the thickness of the cured product would be 100 to 200 m. The dish was loaded into an oven kept at 80° C. The curing time (the time taken until the composition was not stuck to fingers: gelling time) was derived, and the curability was evaluated based on the following standards.

☆☆: The gelling time at 80° C. is within 10 min.

☆: The gelling time at 80° C. is longer than 10 min but within 30 min.

Δ: The gelling time at 80° C. is longer than 30 min but within 1 hr.

X: Not cured at 80° C. in 1 hr.

The same amount of the curable organopolysiloxane composition was spread on an aluminum dish in the same way as described above, and the curability at 25° C. was evaluated based on the following standards.

☆☆: Not cured at 25° C. in 48 hrs.

☆: The gelling time at 25° C. is longer than 24 hrs. but within 48 hrs.

X: The gelling time at 25° C. is within 24 hrs.

| | | Practical Examples | | | |
|---|---|---|---|---|---|
| | | 1 | 2 | 3 | 4 |
| Components of the Curable Organopolysiloxane Compositions (parts by mass) | component (a-1) | 100 | 100 | 100 | 100 |
| | component (b-1) | 71.7 | 71.7 | 71.7 | 71.7 |
| | component (c-1) | 0.17 | 0.85 | 0.17 | 0.034 |
| | component (c-2) | — | — | — | — |
| | component (c-3) | — | — | — | — |
| | component (c-4) | — | — | — | — |
| | component (c-5) | — | — | — | — |
| | component (c-6) | — | — | — | — |
| | component (d-1) | 0.085 | 0.085 | 0.017 | 0.0017 |
| | component (d-2) | — | — | — | — |
| | component (d-3) | — | — | — | — |
| | component (d-4) | — | — | — | — |
| | component (d-5) | — | — | — | — |
| | component (d-6) | — | — | — | — |
| | component (d-7) | — | — | — | — |
| | component (d-8) | — | — | — | — |
| Content of component (C) (mass %) | | 0.1 | 0.5 | 0.1 | 0.02 |
| Content of component (D) (mass %) | | 0.05 | 0.05 | 0.01 | 0.001 |
| Appearance | | Yellowish green and transparent | Yellowish green and transparent | Light green and transparent | Light green and transparent |
| Curability at 80° C. | | ☆☆ | ☆☆ | ☆☆ | ☆ |
| Curability at 25° C. | | ☆☆ | ☆ | ☆☆ | ☆☆ |

| | | Comparative Examples | | | | |
|---|---|---|---|---|---|---|
| | | 1 | 2 | 3 | 4 | 5 |
| Components of the Curable Organopolysiloxane Compositions (parts by mass) | component (a-1) | 100 | 100 | 100 | 100 | 100 |
| | component (b-1) | 71.7 | 71.7 | 71.7 | 71.7 | 71.7 |
| | component (c-1) | 0.034 | — | — | — | — |
| | component (c-2) | — | — | — | — | — |
| | component (c-3) | — | — | — | — | — |
| | component (c-4) | — | — | — | — | — |
| | component (c-5) | — | — | 0.085 | — | — |
| | component (c-6) | — | — | — | 0.85 | — |
| | component (d-1) | — | — | 0.085 | 0.085 | — |
| | component (d-2) | — | — | — | — | — |
| | component (d-3) | — | — | — | — | — |
| | component (d-4) | — | — | — | — | — |
| | component (d-5) | — | — | — | — | 0.0017 |
| | component (d-6) | — | — | — | — | — |
| | component (d-7) | — | — | — | — | — |
| | component (d-8) | — | — | — | — | — |
| Content of component (C) (mass %) | | 0.02 | 0 | 0.5 | 0.5 | 0 |
| Content of component (D) (mass %) | | 0 | 0 | 0.05 | 0.05 | 0.001 |
| Appearance | | Colorless and transparent | Colorless and transparent | Yellow and transparent | Yellow and transparent | Yellow and transparent |
| Curability at 80° C. | | ☆ | X | X | X | X |
| Curability at 25° C. | | X | ☆☆ | ☆☆ | ☆☆ | ☆☆ |

|  |  | Practical Examples |  |  |  |  |
|---|---|---|---|---|---|---|
|  |  | 5 | 6 | 7 | 8 | 9 |
| Components of the Curable Organopolysiloxane Compositions (parts by mass) | component (a-1) | 100 | 100 | 100 | 100 | 100 |
|  | component (b-1) | 71.7 | 71.7 | 71.7 | 71.7 | 71.7 |
|  | component (c-1) | — | — | — | — | 0.017 |
|  | component (c-2) | 0.085 | 0.85 | — | — | — |
|  | component (c-3) | — | — | 17.17 | — | — |
|  | component (c-4) | — | — | — | 1.7 | — |
|  | component (c-5) | — | — | — | — | — |
|  | component (c-6) | — | — | — | — | — |
|  | component (d-1) | — | 0.085 | 0.17 | 0.085 | — |
|  | component (d-2) | — | — | — | — | — |
|  | component (d-3) | — | — | — | — | — |
|  | component (d-4) | — | — | — | — | — |
|  | component (d-5) | 17.17 | — | — | — | 0.0017 |
|  | component (d-6) | — | — | — | — | — |
|  | component (d-7) | — | — | — | — | — |
|  | component (d-8) | — | — | — | — | — |
| Content of component (C) (mass %) |  | 0.05 | 0.5 | 10 | 0.02 | 0.01 |
| Content of component (D) (mass %) |  | 10.0 | 0.05 | 0.1 | 0.001 | 0.001 |
| Appearance |  | Colorless and transparent | Colorless and transparent | Colorless and transparent | Colorless and transparent | Colorless and transparent |
| Curability at 80° C. |  | ☆ | ☆☆ | ☆☆ | Δ | ☆ |
| Curability at 25° C. |  | ☆☆ | ☆☆ | ☆☆ | ☆☆ | ☆☆ |

TABLE 3

|  |  | Practical Examples |  |  |
|---|---|---|---|---|
|  |  | 10 | 11 | 12 |
| Components of the Curable Organopolysiloxane Compositions (parts by mass) | component (a-1) | 100 | 100 | 100 |
|  | component (b-1) | 71.7 | 71.7 | 71.7 |
|  | component (c-1) | 0.017 | 0.17 | 0.17 |
|  | component (c-2) | — | — | — |
|  | component (c-3) | — | — | — |
|  | component (c-4) | — | — | — |
|  | component (c-5) | — | — | — |
|  | component (c-6) | — | — | — |
|  | component (d-1) | — | — | — |
|  | component (d-2) | 0.0085 | — | — |
|  | component (d-3) | — | 0.017 | — |
|  | component (d-4) | — | — | 0.017 |
|  | component (d-5) | — | — | — |
|  | component (d-6) | — | — | — |
|  | component (d-7) | — | — | — |
|  | component (d-8) | — | — | — |
| Content of component (C) (mass %) |  | 0.1 | 0.1 | 0.1 |
| Content of component (D) (mass %) |  | 0.005 | 0.01 | 0.01 |
| Appearance |  | Light green and transparent | Colorless and transparent | Colorless and transparent |
| Curability at 80° C. |  | ☆☆ | ☆☆ | ☆☆ |
| Curability at 25° C. |  | ☆☆ | ☆☆ | ☆☆ |
|  |  | 13 | 14 | 15 |
| Components of the Curable Organopolysiloxane Compositions (parts by mass) | component (a-1) | 100 | 100 | 100 |
|  | component (b-1) | 71.7 | 71.7 | 71.7 |
|  | component (c-1) | 0.017 | 0.017 | 0.017 |
|  | component (c-2) | — | — | — |
|  | component (c-3) | — | — | — |
|  | component (c-4) | — | — | — |
|  | component (c-5) | — | — | — |
|  | component (c-6) | — | — | — |
|  | component (d-1) | — | — | — |
|  | component (d-2) | — | — | — |
|  | component (d-3) | — | — | — |
|  | component (d-4) | — | — | — |
|  | component (d-5) | — | — | — |
|  | component (d-6) | 0.0085 | — | — |
|  | component (d-7) | — | 0.017 | — |
|  | component (d-8) | — | — | 0.017 |

TABLE 3-continued

|  | Practical Examples |  |  |
|---|---|---|---|
| Content of component (C) (mass %) | 0.1 | 0.1 | 0.1 |
| Content of component (D) (mass %) | 0.005 | 0.01 | 0.01 |
| Appearance | Colorless and transparent | Colorless and transparent | Colorless and transparent |
| Curability at 80° C. | ☆☆ | ☆☆ | ☆☆ |
| Curability at 25° C. | ☆☆ | ☆☆ | ☆☆ |

It was confirmed based on the results of Practical Examples 1 to 4 that the curable organopolysiloxane composition of the present invention could be cured quickly at 80° C. and had sufficiently long uncured time at 25° C. It was also confirmed that the curability at these temperatures could be adjusted by optimizing the dosages of components (C) and (D).

On the other hand, it was confirmed based on the results of Comparative Examples 1 and 2 that the curable organopolysiloxane composition containing no component (D) and the curable organopolysiloxane composition containing neither component (C) nor component (D) could not satisfy the curability at these two temperatures at the same time.

It was confirmed based on the results of Comparative Examples 3 and 4 that the curable organopolysiloxane composition using a photo radical initiator was cured slowly at 80° C.

It was confirmed based on the results of Practical Examples 5 to 9 that a curable organopolysiloxane composition that could be cured quickly at 80° C. and had sufficiently long uncured time at 25° C. could be prepared by optimizing the dosages of various components (C) and (D) in the curable organopolysiloxane composition of the present invention.

On the other hand, it was confirmed based on the result of Comparative Example 5 that the curability at 80° C. of the curable organopolysiloxane composition containing no component (C) was insufficient.

It was confirmed based on the results of Practical Examples 10 to 15 that a wide range of components (D)

could be applied to the curable organopolysiloxane composition of the present invention and a curable organopolysiloxane composition that could be cured quickly at 80° C. and had sufficiently long uncured time at 25° C. could be prepared by optimizing the dosage of this component.

INDUSTRIAL APPLICABILITY

Since the curable organopolysiloxane composition of the present invention has good curability even at 80° C., it can be used for coating on an object to be coated lacking heat resistance, such as plastic films.

The invention claimed is:

1. A curable organopolysiloxane composition comprising:
(A) an alkenyl group-containing organopolysiloxane of the following average compositional formula:

$$R^1{}_aR^2{}_bSiO_{(4-a-b)/2}$$

wherein $R^1$ represents a $C_{2-12}$ alkenyl group; $R^2$ represents a hydrogen atom, $C_{1-12}$ alkyl group, $C_{6-20}$ aryl group, $C_{7-20}$ aralkyl group, hydroxyl group, or $C_{1-6}$ alkoxy group; there are at least two $R^1$ in a molecule; and "a" and "b" are numbers satisfying: $0<a\leq1$, $0<b<3$, and $0.8<a+b<3$;

(B) a compound having at least two thiol groups in a molecule, in an amount such that the thiol groups in component (B) is 0.3 to 3 mol with respect to 1 mol of the alkenyl groups in component (A);

(C) an azo compound with a 10 hour half-life temperature of 25° C. or higher but lower than 60° C.; and (D) at least one type of compound selected from the group consisting of quinone compounds, compounds having one or two aromatic hydroxyl groups in a molecule, compounds having one thiol group in a molecule, nitrosamine compounds, hydroxylamine compounds, and phenothiazine compounds.

2. The curable organopolysiloxane composition according to claim 1, wherein component (A) comprises the $C_{6-20}$ aryl groups.

3. The curable organopolysiloxane composition according to claim 1, wherein component (B) comprises:
(B1) a thiol group-containing organopolysiloxane of the following average compositional formula:

$$R^3{}_cR^4{}_dSiO_{(4c-d)/2}$$

wherein $R^3$ is at least one type of thiol group selected from the group consisting of thiolalkyl groups and thiolaryl groups; $R^4$ represents a hydrogen atom, $C_{1-12}$ alkyl group, $C_{6-20}$ aryl group, $C_{7-20}$ aralkyl group, hydroxyl group, or $C_{1-6}$ alkoxy group; there are at least two $R^3$ in a molecule; and "c" and "d" are numbers satisfying: $0<c<1$, $0<d<3$, and $0.8<c+d<3$; and/or (B2) a thiol compound having at least two thiol groups in a molecule.

4. The curable organopolysiloxane composition according to claim 1, wherein the content of component (C) is in the range of 0.01 to 10 mass % with respect to the total amount of components (A) to (D).

5. The curable organopolysiloxane composition according to claim 1, wherein the content of component (D) is in the range of 0.001 to 10 mass % with respect to the total amount of components (A) to (D).

6. The curable organopolysiloxane composition according to claim 1, further comprising (E) an organic solvent.

7. The curable organopolysiloxane composition according to claim 6, wherein the content of component (E) is no greater than 3,000 parts by mass with respect to 100 parts by mass of the total amount of components (A) to (D).

8. The curable organopolysiloxane composition according to claim 1, further defined as a coating composition.

9. A cured product obtained by curing the curable organopolysiloxane composition according to claim 1.

* * * * *